United States Patent
Clements et al.

(10) Patent No.: US 6,855,795 B2
(45) Date of Patent: Feb. 15, 2005

(54) CATALYST REMOVAL PROCESS

(75) Inventors: John H. Clements, Round Rock, TX (US); Howard P. Klein, Austin, TX (US); Kenneth M. Hillman, Georgetown, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 10/850,249

(22) Filed: May 20, 2004

(65) Prior Publication Data

US 2004/0236069 A1 Nov. 25, 2004

Related U.S. Application Data

(60) Provisional application No. 60/472,241, filed on May 21, 2003.

(51) Int. Cl.$^7$ .............................................. C08G 64/00
(52) U.S. Cl. ........................ 528/196; 502/107; 502/150
(58) Field of Search .................................. 502/107, 150; 528/196

(56) References Cited

U.S. PATENT DOCUMENTS

2002/0045534 A1 * 4/2002 Lee et al. ...................... 502/22
2003/0205516 A1 * 11/2003 Bohn et al. .................. 210/251

* cited by examiner

Primary Examiner—Terressa Boykin
(74) Attorney, Agent, or Firm—Christopher J. Whewell

(57) ABSTRACT

The present invention provides a process for producing polycarbonates in the presence of one or more alkali metal or alkaline-earth metal catalysts, and subsequently removing the catalyst residues by chelation, to yield a clear polycarbonate product that is free from catalyst residues, and is thus suitable for use as a binding material in the ceramics industry where residual amounts of catalysts in the binder are burdensome.

8 Claims, No Drawings

CATALYST REMOVAL PROCESS

This application claims the benefit of Provisional Application No. 60/472,241 filed May 21, 2003.

TECHNICAL FIELD

The present invention relates generally to providing polycarbonates. More particularly, it relates to providing polycarbonates from aliphatic diols with linear organic carbonates in the presence of a catalyst, which catalyst is subsequently removed through use of a chelating agent.

BACKGROUND INFORMATION

The synthesis of aliphatic polycarbonates via the transesterification of a low boiling carbonate source such as an organic linear carbonate (dimethyl carbonate, diethyl carbonate) is often conducted in the presence of alkali salt catalysts such as sodium carbonate or potassium hydroxide. However, there exist certain end-use applications in which the presence of residual amounts of catalyst in the final product negatively affect product performance. For instance, certain polycarbonates find use as fugitive binders for ceramics and glasses employed in electronic and optical applications, and the presence of even small amounts of catalyst residues can impair final product performance. Thus, it is highly desirous for such residual quantities of catalysts to be removed or otherwise precluded from being present in the final product. However, removal of residual amounts of catalysts typically involve additional process steps, which add to the expense of producing the desired end product.

SUMMARY OF THE INVENTION

The present invention provides a low-cost, easily implemented process for catalyst removal from systems useful for producing polycarbonates on a commercial scale.

The present invention provides a process for producing a polycarbonate having the structure:

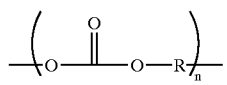

in which n is any number between about 5 and 50, R is any $C_1$ to $C_{20}$ alkyl group, whether straight-chain, cyclic, or branched, comprising the steps of: a) reacting a reaction mixture comprising an aliphatic diol according to the formula HO—R—OH (in which R is any $C_1$ to $C_{20}$ alkyl group, whether straight-chain, cyclic, or branched) and a linear organic carbonate having the formula:

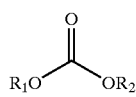

in which $R_1$ and $R_2$ are each independently any alkyl groups ranging from $C_1$ to $C_4$, linear or branched, at a temperature of 60° C. to 180° C. in the presence of a catalyst selected from the group consisting of: one or more alkali or alkaline earth metal alkoxide, hydroxide, carbonate, or carboxylate salts, or mixtures of any of the foregoing; b) supplying heat to the reaction mixture to cause distillation of alcohol by-product(s) produced from step a) above until the reaction mixture reaches a termination temperature of at least 150° C. to provide a semi-stripped crude product; c) contacting the semi-stripped crude product from step b) with a chelating agent; to form a slurry; and d) filtering the slurry from step c) to provide a clear liquid.

DETAILED DESCRIPTION

Aliphatic polycarbonates of structure (I),

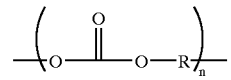

in which n is between about 5 and 50 and where R may be any $C_1$ to $C_{20}$ alkyl chain, linear or branched, may be synthesized by reacting aliphatic diols of structure II,

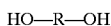

HO—R—OH in which R has the same meaning described above, with low boiling carbonates such as linear organic carbonates of structure III,

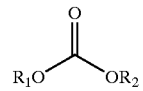

in which $R_1$ and $R_2$ may independently be alkyl groups ranging from $C_1$ to $C_4$, linear or branched. It is preferred to carry out such a reaction in the presence of a catalyst, which is generally an alkali salt catalyst such as an alkali or alkaline earth metal carbonate, alkoxide, carboxylate, or hydroxide salt, or mixtures of the foregoing. Although such species are effective catalysts, their presence in the polycarbonate product may hinder its performance in certain applications. Unfortunately, catalyst removal processes can be quite costly, especially when polymers are involved. For this reason, a relatively low-cost, industrially applicable catalyst removal process is needed.

During reactions such as those described above, an alcohol by-product of the formula $R_1OH$ or a mixture of alcohol by-products of formulae $R_1OH$ and $R_2OH$, in which $R_1$ and $R_2$ have the meaning described above, is obtained. Often, it is possible to remove the alcohol by-product from the reaction as an azeotropic mixture of alcohol and corresponding linear organic carbonate. For example, methanol and dimethylcarbonate. In large-scale processes, it is possible to separate and recycle the linear carbonate species. Aside from this reclamation process, the by-product serves no useful purpose and contributes to the waste stream. The present invention provides a process by which the reaction by-product may be used as a catalyst removal solvent.

By dissolving the polymer obtained in its own reaction by-product, a homogeneous, low-viscosity solution may be obtained that may be treated with MAGNESOL® XL or similar chelating agent and filtered to remove catalyst salts. The by-product solvent may then be removed and, if desired, reused. Furthermore, linear carbonate reactant present in the by-product may be reclaimed at this time. MAGNESOL® XL is a magnesium silicate adsorbent available from the Dallas Group of America, Inc. Other functionally-equivalent adsorbents are useful in the present invention.

In one sense, the synthesis of aliphatic polycarbonates as described above may be thought of as a two-stage process. In the first stage, alcohol by-product or an azeotropic composition of alcohol by-product and linear carbonate reactant is distilled, driving reaction conversion. In the second stage, reduced pressures and high temperatures are employed to complete the removal process. During this process, unreacted linear carbonate as well as alcohol and unreacted aliphatic diol are removed from the product. Once both stages have been completed, it is possible to re-dissolve the polymer in distillate collected during the first stage such that a catalyst removal process may be performed. However, certain difficulties regarding this process have been encountered. Because the second stage of the reaction process functions as an important molecular weight building step, the resulting polymer can be quite difficult to dissolve.

We have found that the pre-polymer obtained upon completion of the first stage of the reaction possesses a significantly lower molecular weight and is therefore much easier to process. Unlike material obtained upon completion of the second stage, a mixture containing between 50 and 67% pre-polymer in first stage reaction distillate is quite stable and easy to obtain. Thus, by performing the catalyst removal step before the second stage of the reaction, employing MAGNESOL® XL or other chelating agent, the process is simplified. Once the treated mixture has been filtered to remove the chelating agent, the second stage of the reaction can be performed. A comparison of examples 1 and 2 shows that the molecular weight of the final, catalyst-free material is somewhat lower relative to material obtained in the comparative example. This suggests that catalyst may be necessary to effect the same molecular weight building that is seen in the second stage of the comparative reaction. However, the polymer obtained is still quite useful in applications where these types of polycarbonates find employment. In fact, the slightly lower molecular weight is beneficial when working with polycarbonates that otherwise possess melting points>70° C. In such cases, the melting point of the material is reduced to 40–60° C., enabling easier processing.

A catalyst removal process according to the present invention adds only one step to the processing. Molecular weight, and thus melting point of polymer, is slightly lower, easing processing of otherwise high melting substances.

COMPARATIVE EXAMPLE 2747 g of 2,2-dimethyl-1,3-propanediol (neopentyl glycol, "NPG"), 3326 g dimethyl carbonate ("DMC", 40% excess basis NPG), and 18 g sodium carbonate (0.30 wt. % total charge) were placed in a 12-L, 3-neck round-bottom flask. A distillation apparatus was assembled consisting of an 18" long, 1" wide silver-lined, vacuum-jacketed column packed with HASTALLOY® B, variable reflux K-head, cold water condenser, and receiver. The flask with contents was affixed to the bottom of the distillation column and warmed to 50° C. in order to obtain a homogeneous, low-color solution (with the exception of catalyst). The entire assembly was purged with nitrogen via the bubbling of gas through the reaction mixture for 45 minutes. Using a VARIAC® heat source, the mixture was heated to approximately 90° C. at which time an azeotropic composition of methanol and DMC began to reflux at an overhead temperature of 63–65° C. After 15 minutes of reflux, distillate was collected overhead at a reflux/takeoff ratio of 4/1 to 1/1. After 32 hours of collection, the reactor temperature had risen to 55° C. During this time, 1764 g of overhead was collected, composition: 65.0 wt. % methanol by GC analysis (67.8% of theoretical). The reactor contents were then cooled to 60° C. and the system pressure was gradually reduced to 25 mm Hg over a 10-hour period. During this time, the reactor temperature was slowly increased to 155° C. The reactor contents were held at 155° C. under a pressure of 25 mmHg for 1 hour. During this time, an additional 415 g of distillate was removed overhead. The molten polymer formed was cooled to 110° C., poured into a pan, and allowed to harden 3492 g of poly(neopentyl glycol carbonate) was obtained, whose analysis follows: appearance=white solid; Melting Point (DSC, annealed sample)=95.9° C. (peak); Weight Average Molecular Weight (GPC)=2275; Hydroxyl Number=69.6 mg KOH/g; Sodium (AA)=1355 ppm.

1233 g of the polymer obtained above was blended with 1233 g of a 65/35 wt./wt. mixture of methanol and DMC (composition equal to that of distillate removed during above reaction). Although mild heating (40–50° C.) and agitation were employed, a homogeneous solution did not result. A considerable amount of polymer remained undissolved. Although an additional 1233 g of Methanol/DMC mixture was added, a homogeneous solution was still not obtained. Upon addition of 1200 g acetone, a homogeneous solution was finally obtained with heating to 40–50° C. To this warm polymer solution (25.1 wt. % solids) was added 110 g MAGNESOL® XL, an amount equal to 17 times the expected amount of sodium carbonate catalyst residue present. The resulting mixture was stirred for 16 hours at room temperature. The precipitation of significant amounts of polymer was noticed after the first hour. After 16 hours, it was estimated that approximately 30% of the material had fallen out of solution. Upon filtration via water aspiration, additional precipitate could be seen forming in the filtered liquid. For these reasons, the catalyst removal process was deemed a failure. No further analysis was performed.

Example 1

Employing the same general method described in the comparative example above, 1213 g of NPG was reacted with 1467 g DMC in the presence of 5.0 g potassium carbonate (0.19 wt. % total charge). As overhead was collected over an 8-hour period, the reactor was allowed to warm from 90° to 170° C. During this time, 711 g of methanol/DMC azeotrope was removed overhead, composition:

65.1% methanol (67.6% of theoretical). Rather than remove additional methanol and other lights at reduced pressure as described in the comparative example above, the pre-polymer obtained was stored without further processing. Analysis: appearance=low-color, low-melting solid; Melting Point (DSC, annealed sample)=1649° C. (broad); Weight Average Molecular Weight (GPC)=300–1000 (broad), Hydroxyl Number=196.7 mg KOH/g. Distillate from this reaction (64.9/35.1 wt./wt. methanol/DMC azeotrope) was added to the pre-polymer product in order to obtain a homogeneous, low-color, low-viscosity solution. Unlike the mixtures obtained in the comparative example above, a homogeneous pre-polymer solution, with the exception of small amounts of undissolved catalyst, was quite easy to obtain with only minimal agitation and no heating.

The solution from example 1 was treated with MAGNESOL® XL as detailed in table I below. The amount of MAGNESOL® XL employed in each example is given in multiples of the amount of potassium carbonate catalyst expected in each pre-polymer sample treated. Each mixture is described as a ratio of the amount of pre-polymer to the amount of methanol/DMC azeotrope employed. Stirring time is given in hours. Potassium concentration is given in terms of ppm and was determined by atomic absorption (AA).

TABLE I

| Example | Ratio | MAGNESOL® XL | Time (hrs.) | Potassium |
|---------|-------|--------------|-------------|-----------|
| 1A | 2:1 | 5 | 1.5 | 350 |
| 1B | 2:1 | 15 | 1.5 | 45 |
| 1C | 2:1 | 30 | 1.5 | 1.9 |
| 1D | 1:1 | 5 | 1.5 | 325 |
| 1E | 1:1 | 30 | 12 | 6.0 |

The initial potassium concentration in the 2:1 and 1:1 mixtures of pre-polymer and methanol/DMC blend is 665 and 515 ppm, respectively prior to treatment.

Given the data observed in table I it is clear that a reduction in the concentration of potassium is observed in all cases. However, only IC and ID exhibit sufficient reduction to obtain materials useful in high-end electronic applications. Although method IE appears slightly less effective than method IC, the resulting solution is less viscous and therefore easier to filter. For this reason, method IC was performed on a larger scale. 1340 g of pre-polymer was mixed with 1340 g of a 65/35 wt./wt. methanol/DMC mixture. 126 g of MAGNESOL® XL was added to the resulting homogeneous solution and the mixture stirred for 12 hours. Upon filtration, a potassium concentration of 4.0 ppm was obtained. The solvent was removed via a two-stage process in which the mixture was exposed to temperatures of 40–50° C. and pressures of 150–300 mmHg during the first stage and temperatures of 60–100° C. and pressures of 2–100 mm Hg in the second stage. Ultimate conditions of 100° C. and 2 mmHg were maintained for 2 hours to fully remove all lights. The resulting polymer was poured into a pan and allowed to cool. Analysis: appearance=white solid; Melting Point (DSC, annealed sample)=71.6° C. (peak); Weight Average Molecular Weight (GPC)=1555; Hydroxyl Number=103.3 mg KOH/g; Potassium (AA)=12 ppm.

Example 2

1537 g NPG and 1860 g DMC (40% excess basis PNG) were reacted in the presence of 6.8 g sodium carbonate catalyst (0.20 wt. % total charge) in the manner illustrated in example 1. The molten pre-polymer obtained was poured out of the reactor and into two 1-gallon glass bottles. 932 g of pre-polymer was poured into the first bottle and 1058 g was placed into the second bottle. During the transfer of polymer from the reactor to the second glass bottle, a significant amount of solid catalyst was transferred as well. For this reason, the two aliquots were kept separate to determine if the 0.20 catalyst removal method developed in example 1 is equally effective. A 65/35 wt./wt. mixture of methanol/DMC was added to each aliquot such to create a 1:1 wt./wt. mixture. Each subjected to catalyst removal method IE and filtered. Note that all glassware used in this process was pre-rinsed with deionized water and dried to prevent sodium contamination. Sodium concentrations of 13 and 10 ppm were obtained for the first and second solutions, respectively. Thus, the catalyst removal method developed was found to work equally well regardless of the differing catalyst levels. The two solutions were therefore combined and subjected to the solvent removal process described in example 1. Analysis: appearance=white solid; Melting Point (DSC, annealed sample)=66.5° C. (peak); Weight Average Molecular Weight (GPC)=1565; Hydroxyl Number=105.2 mg KOH/g; Sodium (AA)=23 ppm.

Catalyst removal in a process according to the invention may be undertaken at any temperature in the range of between 10°–100° C. A reaction between a diol and a carbonate according to the invention may at any pressure in the range of between 1–800 mmHg. Catalyst removal may be undertaken at any pressure in the range of between 1–800 mmHg.

What is claimed is:

1. A process for producing a polycarbonate having the structure:

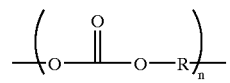

in which n is any number between about 5 and 50, R is any $C_1$ to $C_{20}$ alkyl group, whether straight-chain, cyclic, or branched, comprising the steps of:

a) reacting a reaction mixture comprising an aliphatic diol according to the formula: HO—R—OH in which R is any $C_1$ to $C_{20}$ alkyl group, whether straight-chain, cyclic, or branched and a linear organic carbonate having the formula:

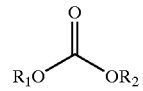

in which $R_1$ and $R_2$ may independently be alkyl groups ranging from $C_1$ to $C_4$, linear or branched, at a temperature of 60° C. to 180° C. in the presence of a catalyst selected from the group consisting of: one or more alkali or alkaline earth metal alkoxide, hydroxide, carbonate, or carboxylate salts, or mixtures of any of the foregoing;

b) supplying heat to said reaction mixture to cause distillation of alcohol by-product(s) produced from step a) above until said reaction mixture reaches a termination temperature of at least 150° C. to provide a semi-stripped crude product;

c) contacting said semi-stripped crude product from step b) with a chelating agent; to form a slurry; and d) filtering said slurry from step c) to provide a clear liquid.

2. A process according to claim 1 wherein said semi-stripped crude product is mixed with an alcohol prior to its being contacted with a chelating agent or adsorbent.

3. A process according to claim 1 wherein said chelating agent is a magnesium silicate.

4. A process according to claim 1 wherein said termination temperature is in the range of 150° C. to 200° C.

5. A process according to claim 1 wherein said termination temperature is in the range of 160° C. to 200° C.

6. A process according to claim 1 wherein said termination temperature is in the range of 170° C. to 200° C.

7. A process according to claim 1 wherein said termination temperature is in the range of 180° C. to 200° C.

8. A process according to claim 1 wherein said termination temperature is in the range of 190° C. to 200° C.

* * * * *